United States Patent [19]
Pettersen et al.

[11] 4,035,702
[45] July 12, 1977

[54] ELECTRONIC GARAGE DOOR OPENER SAFETY DEVICE

[75] Inventors: Malvin P. Pettersen, Cicero; Richard G. Merrell, Darien, both of Ill.

[73] Assignee: Malvin P. Pettersen, Cicero, Ill.

[21] Appl. No.: 608,160

[22] Filed: Aug. 27, 1975

[51] Int. Cl.² .......... H02P 1/22
[52] U.S. Cl. .......... 318/285; 318/286; 318/256; 318/467; 318/283
[58] Field of Search .......... 318/264, 445, 446, 447, 318/484, 452, 283, 285, 286, 256, 466, 467; 49/29, 30, 31

[56] References Cited

U.S. PATENT DOCUMENTS

| | | | |
|---|---|---|---|
| 2,756,990 | 7/1956 | Reamey | 318/445 |
| 3,189,812 | 6/1965 | Davis | 318/445 |
| 3,283,236 | 11/1966 | Legg | 318/445 |
| 3,617,835 | 11/1971 | Dreher et al. | 318/285 |
| 3,846,687 | 11/1974 | Daniels et al. | 318/446 |

OTHER PUBLICATIONS

Markus, *Source Book of Electronic Circuits*, 1968, pp. 4, 328 and 329.

*Primary Examiner*—Robert K. Schaefer
*Assistant Examiner*—Eugene S. Indyk

[57] ABSTRACT

The disclosure relates to a safety device for use in a garage door opening and closing system of the type which includes an impulse actuated reversible motor which opens and closes the garage door and wherein the safety device automatically actuates the motor for closing the door should the door be inadvertantly opened or accidentally remained open. The safety device includes a detector for detecting the open or closed condition of the door, a counter for keeping time responsive to the detector detecting that the door is open, and a logic circuit for providing repetitive impulses to the motor to actuate the motor for closing the door. The counter terminates keeping time and is reset by the detector when the detector detects that the door is closed. The safety device additionally includes an indicator responsive to the repetitive impulses for indicating that the logic circuits have actuated the motor for closing the door.

21 Claims, 1 Drawing Figure

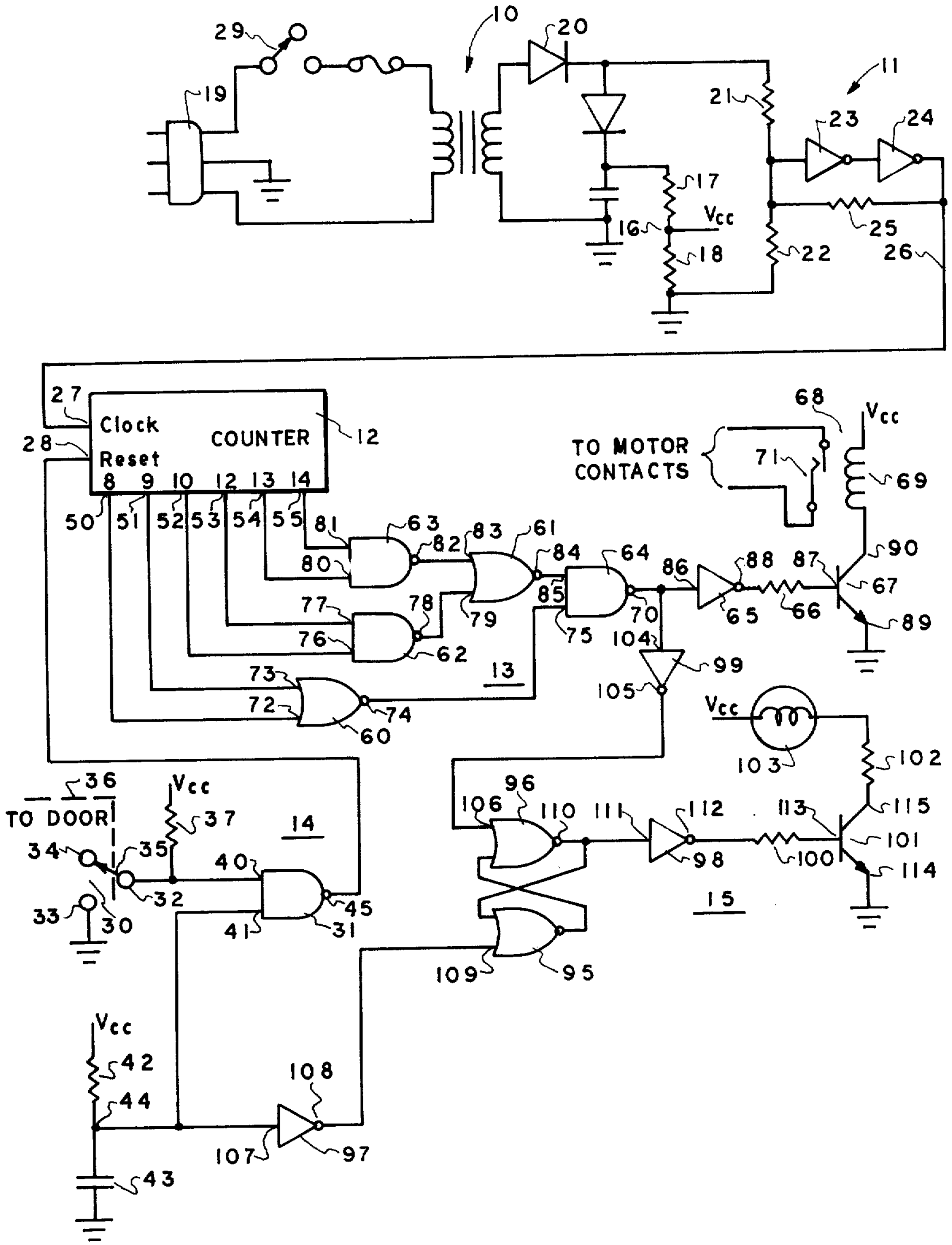
Clock
Reset
COUNTER
8 9 10 12 13 14
TO MOTOR CONTACTS
TO DOOR
Vcc
10
11
12
13
14
15

ELECTRONIC GARAGE DOOR OPENER SAFETY DEVICE

BACKGROUND OF THE INVENTION

The invention is generally directed to a safety device for use in a door opening and closing system of the type which includes an impulse actuated reversible motor for opening and closing the door and in particular to a safety device for use in a garage door opening and closing system of the type which includes an impulse actuated reversible motor which opens and closes the door for automatically actuating the motor for closing the door should the door be inadvertantly opened or accidentally remained open.

Electronic garage door opening and closing systems which are actuated by portable transmitter are well known. Such systems provide the convenience of permitting the garage door to be opened and closed without the physical effort and inconvenience associated with the manual operation for garage doors. They also provide an element of personal safety in that the operator need not leave his car in order to open and close the garage door.

One type of garage door opening and closing system is the impulse type. Impulse type systems require only a short duration electronic signal from the portable transmitter after which the door opener is fully automatic for completely opening or closing the garage door. Because of there convenience in use, such systems are becoming ever increasingly popular.

While such systems have been found to accomplish the purpose of opening and closing garage doors, they are not completely reliable. As with all radio controlled devices, one inherent difficulty is that they will respond to both intentionally or unintentionally produced signals of the required frequency and/or coding. Even though manufacturers have expended great effort to reduce the probability of random openings due to unintentionally produced signals, nevertheless, it is an empirical fact that the probability of such a occurrence exists. With impulse type systems the problem is only aggravated by the fact that only a momentary random signal is necessary in order to actuate the system motor for opening the garage door.

A further aggravating factor related to this general problem is that the garage door openers, on the average, have a cycle time of approximately eight to ten seconds to close the garage doors. Many operators in a hurry to exit their garages activate the system motor with the portable transmitter without waiting to see if the door is fully closed. Should any minor malfunction occur in the system, the garage door will remain partially or totally open.

From a security standpoint, the associated results of a garage door being accidentally opened or inadvertantly remained open may be serious. The seriousness of the consequenses is clear when it is realized that garages are used by homeowners for storing literally thousands of dollars worth of tools and lawn and garden equipment. Also, many garages are attached to homes wherein only a service entrance door separates the garage from the inside of the home. Such service doors are generally totally lacking in security devices so that a garage door left open provides an obvious invitation to both vandalism and burglary.

It is therefore a general object of the present invention to provide a safety device for a door opening and closing system of the type which includes an impulse actuated motor which opens and closes the door.

It is a more particular object of the present invention to provide a safety device for a garage door opening and closing system of the type which includes an impulse actuated reversible motor which opens and closes the door for automatically actuating the motor for closing the door should the door be inadvertantly opened or accidentally remained open.

It is a still more particular object of the present invention to provide a safety device for a garage door opening and closing system wherein the safety device may be added to such a system without greatly altering the system.

SUMMARY OF THE INVENTION

The invention provides a safety device for use in a door opening and closing system for the type which includes an impulse actuated reversible motor which opens and closes the door for automatically actuating the motor for closing the door should the door be inadvertantly opened or accidentally remain open. The safety device comprises a detector for detecting when the door is in a first condition and for detecting when the door is in a second condition, the first condition corresponding to the door being open and the second condition corresponding to the door being closed. The safety device additionally comprises a control means coupled to the detector and to the motor for providing the motor with repetitive impulses for actuating the motor to close the door responsive to the detector when the door is in the first condition and for terminating the repetitive impulses responsive to the detector when the door is in the second condition.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawing, in which the single FIGURE is a schematic circuit diagram of a safety device embodying the present invention.

DESCRIPTION OF THE PREFERRED EMBODIMENT

Referring now to the sole FIGURE, the embodiment of the safety device of the present invention there shown comprises a conventional half-wave power supply 10, a source of clock pulses 11, a control means comprising a counter 12 and a logic circuit 13, a detector 14, and an indicating means 15.

The half-wave power supply 10 is of conventional design and need not be described in detail herein. It develops at the common junction 16 of resistors 17 and 18 a DC supply voltage to be utilized by the safety device circuit. A conventional three prong AC plug 19 is adapted for connection to a source of standard AC house current within the garage to provide the power supply 10 with AC voltage from which the supply voltage is derived.

The power supply 10 includes diode 20 which preserves the 60 cycle AC waveform to be utilized by the clock pulse source 11. Clock source 11 includes resistors 21 and 22, inverters 23 and 24, and feedback resistor 25. Resistors 21 and 22 attenuate the sixty cycle signal provided by the power supply 10 and inverters 23 and 24 and resistor 25 comprise a hysteresis and feedback circuit for deriving at line 26 a train of 60 cycle clock pulses having negative going trailing edges of short duration. The clock pulses are applied to the clock input 27 of counter 12.

The detector 14 detects first and second conditions of the garage door, the first condition corresponding to the garage door being open and the second condition corresponding to the garage door being closed. It comprises switch 30 and NAND gate 31. Switch 30 has common terminal 32, terminals 33 and 34, and wiper 35. Wiper 35 is coupled to the garage door as represented by the dashed line 36 so that switch 30 is in the position shown when the garage door is open and with wiper 35 in contact with terminal 33 when the garage door is closed. Resistor 37 is coupled between the supply voltage and terminal 32 of switch 30 which is also coupled to input 40 of NAND gate 31. Terminal 33 of switch 30 is coupled to ground. Input 41 of NAND gate 31 is coupled to the common junction of resistor 42 and capacitor 43. Resistor 42 is also coupled to the supply voltage and capacitor 43 is also coupled to ground. At the common junction 44 of resistor 42 and capacitor 43 there is a positive DC voltage which is impressed upon input 41 of NAND gate 31. As a result, the detector at output 45 of NAND gate 31 develops first and second signals responsive to the condition of the garage door. When the garage door is open or in the first condition, input 40 will be at a high logic level and input 41 will be at a high logic level providing at output 45 a low logic level signal (the first signal). When the garage door is closed, wiper 33 will be in contact with terminal 33 so that a low logic level will be at input 40 and a high logic level at input 41 of NAND gate 31 to produce at output 45 a high level logic signal (the second signal).

Counter 12 includes clock input 27, reset input 28, and outputs 50 through 55. The counter for this preferred embodiment, if the commercially available and well known CD 4020A 14-stage counter. Reset input 28 is coupled to the output 45 of NAND gate 31 to couple the detector 14 to the counter 12. The counter will provide at outputs 50 through 55 various combinations of high and low logic levels as the counter is clocked at clock input 27 by the clock pulses produced by the clock source 11 and transferred to the counter over line 26. The counter operatively keeps time when reset input 28 is at a low logic level and is reset and terminates the keeping of time when reset input 28 is a high logic level. Therefore, when the garage door is open and in the first condition, the low logic level at output 45 which is impressed upon reset input 28 will allow the counter 12 to keep time by providing the various combinations of high and low logic levels at output 50 through 55 as it is clocked at input 27. When the garage door is closed, the high logic level at output 45 of NAND gate 31 will cause the counter to reset and terminate the keeping of time. For convenience, the various pin numbers associated with the outputs of the counter are included in the sole FIGURE to most clearly illustrate the preferred embodiment. Outputs 50, 51, 52, 53, 54, and 55 correspond to pins 8, 9, 10, 12, 13, and 14 respectively of the CD 4020A 14-stage counter.

The logic circuit 13 comprises NOR gates 60 and 61, NAND gates 62, 63, and 64, inverter 65, resistor 66, transistor 67, and relay 68.

NOR gates 60 and 61 and NAND gates 62, 63, and 64 are interconnected and connected to the various outputs 50 through 55 of counter 12 as shown to provide repetitive impulses of 2 second duration. Not only are the impulses of 2 second duration, but they are spaced apart by predetermined time intervals as explained later herein.

NOR gate 60 has inputs 72 and 73 coupled to outputs 50 and 51 respectively of counter 12. Output 74 of NOR gate 60 is coupled to input 75 of NAND gate 64. NAND gate 62 has inputs 76 and 77 coupled to outputs 52 and 53 respectively of counter 12 and output 78 coupled to input 79 of NOR gate 61. NAND gate 63 has inputs 80 and 81 coupled to outputs 54 and 55 respectively of counter 12 and output 82 coupled to input 83 of NOR gate 61. NOR gate 61 has output 84 coupled to input 85 of NAND gate 64.

Inverter 65 has an input 86 coupled to output 70 of NAND gate 64 and an output 88 coupled to base 87 of transistor 67 by resistor 66. Transistor 67 additionally has an emitter 89 coupled to ground and a collector 90 coupled to relay coil 69.

Transistor 67 serves as a relay driver for translating the two second impulses produced by the logic circuit to the motor contacts of the system motor. When transistor 67 is forward biased by the two second impulses produced by the logic circuit, current will be drawn through relay coil 69 for a period of 2 seconds which causes switch 71 to close to thereby impress the two second impulse on the motor contacts of the system motor to actuate it for closing the door.

The logic circuit 13 provides repetitive impulses to the system motor for actuating the motor and closing the door in the following manner. When the garage door obtains the opened position (the first condition), the low logic level produced at output 45 of NAND gate 31 which is impressed upon reset input 28 of counter 12 will cause the counter to keep time and establish predetermined time periods as it is clocked by the clock pulses received at input 27. When counter 12 has received a sufficient number of clock pulses after approximately 4 minutes and 8 seconds, outputs 50 through 55 will obtain a combination of high and low logic levels to cause the logic circuit to provide a first two second impulse to forward bias transistor 67 to translate the impulse to the motor contacts through relay 68. If the first impulse fails to actuate the motor for closing the garage door, approximately fifteen seconds after the first impulse, the outputs of the counter will attain another combination of high and low logic levels to cause the logic circuit 13 to provide another two second impulse which is similarly transferred to the motor contacts through transistor 67 and relay 68. Following the second impulse, should the garage door still not be closed, the counter 12 will continue keeping time until it has received a sufficient number of additional clock pulses to cause it to recycle and provide a third impulse which is separated in time from the second impulse by approximately 4 minutes and 14 seconds to once again actuate the motor for closing the door. Thus, the logic circuit provides repetitive impulses for actuating the motor for closing the door. Also, the repetitive impulses are separated in time by alternating first and second predetermined time periods wherein the first time period is approximately 15 seconds and the second predetermined time period is approximately 4 minutes and 14 seconds. Thus, the second predetermined time period is substantially longer than the first predetermined time period. Also, both time periods are longer than the time required for the motor to close the door, which is normally eight to ten seconds to avoid impulsing the motor while it is closing the door.

The sequence of events just described continues until the garage door is closed. When the garage door finally closes, the detector 14 will provide at output 45 a high logic level which is impressed upon reset input 28 of counter 12. Reset input 28, because it is at a high level, will now terminate the keeping of time and will also reset. Because the counter has terminated the keeping of time, the clock pulses on line 26 will no longer have an effect at the outputs 50 through 55 of the counter and thus the repetitive pulses are terminated.

The indicating means 15 provides an indication that the safety device has actuated the system motor for closing the door. The indicating means comprises NOR gates 95 and 96, inverters 97, 98, and 99, resistor 100, transistor 101, resistor 102, and light bulb 103. The indicating means 15 illuminates light bulb 103 to indicate that the safety device has actuated the motor for closing the garage door responsive to the first impulse. To that end, inverter 99 has input 104 coupled to output 70 of NAND gate 64 for receiving the first impulse. Inverter 99 inverts the impulse and provides at output 105 the inversion of the first impulse which is impressed upon input 106 of NOR gate 96. Inverter 97 has an input 107 coupled to junction 44 for providing at output 108 a constant low logic level which is impressed upon input 109 of NOR gate 95. NOR gates 95 and 96 are coupled together in a conventional latch arrangement which has an output at output 110 of NOR gate 96 which is coupled to input 111 of inverter 98. Output 112 of inverter 98 is coupled to base 113 of transistor 101 by resistor 100. Emitter 114 of transistor 101 is coupled to ground and the collector 115 of transistor 101 is coupled to light bulb 103 by resistor 102. Light bulb 103 is coupled to the supply voltage as indicated in the sole FIGURE.

When the first impulse is produced, the low logic level impulse produced at output 70 of NAND gate 64 is inverted by inverter 99 and the resulting high logic level is impressed upon input 106 of NOR gate 96. The latch arrangement then provides at output 110 a low logic level which is inverted by inverter 98 to thereby provide base 113 with a high logic level to forward bias transistor 101. When transistor 101 is forward biased, current passes through the light bulb 103 to thereby illuminate the light bulb and provide the indication that the safety device has actuated the motor for closing the garage door. Because of the latch arrangement of NOR gates 95 and 96, the consequent indication is sustained until the safety device is deactivated by the operator. Thus, should the safety device be utilized while a homeowner is away, he will find upon his return by observing the incandesent bulb 103 whether the safety device actuated the motor for closing the garage door.

Resistor 92 and capacitor 43 comprise a reset means for resetting the latch comprising NOR gates 95 and 96 of indicating means 15 for resetting counter 12 should the circuit be reset while the garage door is open. Should the light bulb 103 be on indicating that the safety device had closed the door, the circuit may be reset by simply opening power supply switch 29 removing the supply voltage from the circuit and then closing switch 29 to restore the supply voltage to the circuit.

When switch 29 is opened, light bulb 103 will turn off. When switch 29 is then closed, the time constant of resistor 42 and capacitor 43 will cause a momentary low logic level to appear at junction 44. The momentary low logic level thereby produced is inverted by inverter 97 impressing a momentary high logic level on input 109 of NOR gate 95 to reset the latch. With the latch reset, light bulb 103 will not be turned on again until the control means produces another impulse for closing the door.

The momentary low logic level at junction 44 is also impressed on input 41 of detector NAND gate 31. Should the garage door be open when the circuit is reset, NAND gate 31 responsive to the momentary low logic level at input 41 will provide a high logic level at output 45 to reset counter 12. In doing so, it is assured that the operator will have at least approximately 4 minutes to close the door before the safety device will act to close the door.

Thus, the present invention provides a safety device for use in a door opening and closing system of the type which includes an impulse actuated reversible motor which opens and closes the door for automatically actuating the motor for closing the door should the door be inadvertantly opened or accidentally remained open. Because the safety device is only connected to a conventional AC receptacle and to the contacts of the system motor, the safety device of the present invention may be incorporated into virtually any impulse type garage door opening system. Additionally, because the safety device of the present invention provides repetitive impulses for actuating the motor for closing the garage door until the garage door is closed, it will be assured that the garage door will eventually be closed.

Additionally, the switch of the detector may be arranged relative to the garage door so that the door must be opened a few inches before the switch is opened to detect the open condition of the door to allow for dead space in accounting for branches, snow, or other such obstructions which may normally lie underneath the door.

While a particular embodiment of the invention has been shown and described, modifications may be made, and it is intended in the appended claims to cover all such modifications as may fall within the true spirit and scope of the invention.

We claim:

1. A safety device for use in a door opening and closing system of the type which includes an impulse actuated reversible motor which opens and closes the door, for automatically actuating the motor for closing the door should the door be inadvertantly opened or accidentally remained open, said safety device comprising:

a detector for detecting when the door is in a first condition and for detecting when the door is in a second condition, said first condition corresponding to the door being open and said second condition corresponding to said door being closed; and control means coupled to said detector and to the motor for providing the motor with repetitive impulses for actuating the motor to close the door responsive to said detector when the door is in said first condition and for terminating said repetitive impulses responsive to said detector when the door is in said second condition.

2. A safety device in accordance with claim 1 wherein said control means spaces said repetitive impulses apart by predetermined periods of time, and wherein said predetermined periods of time are longer than the time required for the motor to close the door.

3. A safety device in accordance with claim 1 wherein said control means comprises a timer responsive to said detector for causing said repetitive impulses to be provided a preselected time after said detector detects said first condition.

4. A safety device in accordance with claim 3 wherein said control means separates said repetitive impulses in time by alternating first and second predetermined time periods and wherein said second predetermined time period is substantially longer than said first predetermined time period.

5. A safety device in accordance with claim 4 wherein said timer establishes said predetermined time periods responsive to said detector.

6. A safety device in accordance with claim 5 wherein said control means further comprises a logic circuit coupled to said timer for providing said repetitive impulses responsive to said timer.

7. A safety device in accordance with claim 6 wherein said timer comprises a counter.

8. A safety device in accordance with claim 7 further comprising a source of clock pulses coupled to said counter for clocking said counter.

9. A safety device in accordance with claim 8 wherein said detector provides a first signal responsive to said first condition and a second signal responsive to said second condition, and wherein said counter includes a reset input coupled to said detector for establishing said predetermined time periods responsive to said first signal and for being reset and terminating the establishment of said predetermined time periods responsive to said second signal.

10. A safety device in accordance with claim 3 further comprising an indicator coupled to said control means and responsive to said repetitive impulses for indicating that the motor has been actuated by said control means.

11. A safety device in accordance with claim 10 wherein said indicator includes a latch for causing said indication to be sustained.

12. A safety device in accordance with claim 11 further comprising a reset means coupled to said latch and to said detector for resetting said latch to terminate said sustained indication and for resetting said timer when the door is in said first condition.

13. A safety device in accordance with claim 11 wherein said indicator is responsive to the first one of said impulses.

14. A safety device for use in a door opening and closing system of the type which includes an impulse actuated reversible motor which opens and closes the door, for automatically actuating the motor for closing the door should the door be inadvertantly opened or accidentally remained open, said safety device comprising:

- a detector coupled to the door for providing a first signal when the door is open and for providing a second signal when the door is closed;
- a source of clock pulses;
- a counter coupled to said detector and to said source of clock pulses for keeping time responsive to said first signal; and
- a logic circuit coupled to said counter and to the motor for providing the motor with one impulse for actuating the motor to close the door a preselected period of time after the door is open responsive to said counter.

15. A safety device in accordance with claim 14 wherein said counter includes a reset input coupled to said detector and wherein said counter terminates keeping time and is reset responsive to said detector second signal.

16. A safety device in accordance with claim 15 wherein said logic circuit provides repetitive impulses following said one impulse responsive to said counter and wherein said repetitive impulses are terminated by said counter responsive to said second signal provided by said detector.

17. A safety device in accordance with claim 14 wherein said logic circuit separates said repetitive impulses in time by alternating first and second predetermined time periods and wherein said second predetermined time period is substantially longer than said first predetermined time period.

18. A safety device in accordance with claim 17 wherein said first and second predetermined time periods are longer than the time required for the motor to close the door.

19. A safety device in accordance with claim 14 further comprising an indicator coupled to said logic circuit for providing an indication that the motor has been actuated by said logic circit responsive to said one impulse.

20. A safety device in accordance with claim 19 wherein said indicator includes a latch for sustaining said indication.

21. A safety device in accordance with claim 20 further comprising reset means coupled to said latch and to said detector for resetting said latch to terminate said sustained indication and for resetting said counter when the door is open.

* * * * *